United States Patent [19]

Sato et al.

[11] Patent Number: 4,990,321

[45] Date of Patent: Feb. 5, 1991

[54] METHOD FOR RECOVERING HYDROBROMIC ACID AND METHANOL

[75] Inventors: Masakatsu Sato, Matsudo; Sadami Shimizu, Tokyo; Hanzo Tamabayashi, Tokuyama, all of Japan

[73] Assignee: Tosoh Corporation, Shinnanyo, Japan

[21] Appl. No.: 469,385

[22] Filed: Jan. 24, 1990

[30] Foreign Application Priority Data

Jan. 27, 1989 [JP]   Japan .................................. 1-16295

[51] Int. Cl.$^5$ .......................... C01B 7/09; C07C 29/74; C07C 37/68; C07C 39/16
[52] U.S. Cl. ..................................... 423/486; 423/488; 568/725; 568/726; 568/913; 203/95; 203/DIG. 23
[58] Field of Search ....................... 423/481, 486, 488; 203/18, 95, DIG. 23; 568/725, 726, 913, 918

[56] References Cited

U.S. PATENT DOCUMENTS

| | | | |
|---|---|---|---|
| 3,182,088 | 5/1965 | Hennis ................................. | 568/726 |
| 3,546,302 | 12/1970 | Asadovian et al. .................. | 568/726 |
| 4,180,684 | 12/1979 | Kleinschmit et al. ............... | 568/725 |
| 4,431,847 | 2/1984 | Bossier et al. ....................... | 568/726 |
| 4,451,675 | 5/1984 | Bounds ................................ | 568/726 |
| 4,783,556 | 11/1988 | Mitchell et al. ..................... | 568/726 |

FOREIGN PATENT DOCUMENTS

| | | | |
|---|---|---|---|
| 1268149 | 2/1968 | Fed. Rep. of Germany ...... | 568/726 |
| 1596725 | 11/1968 | France ................................. | 423/481 |
| 225034 | 12/1983 | Japan .................................. | 568/726 |

OTHER PUBLICATIONS

Patent Abstracts of Japan, vol. 1, No. 48, May 1977, Asahi Glass K.K.

*Primary Examiner*—Jeffrey E. Russel
*Assistant Examiner*—Brian M. Bolam
*Attorney, Agent, or Firm*—Oblon, Spivak, McClelland, Maier & Neustadt

[57] ABSTRACT

A method for recovering hydrobromic acid and methanol from a filtrate obtained by brominating bisphenol A in a methanol solvent and filtering off the resulting brominated bisphenol A, which comprises adding water to the filtrate, followed by distillation for purification.

2 Claims, No Drawings

METHOD FOR RECOVERING HYDROBROMIC ACID AND METHANOL

The present invention relates to a method for recovering hydrogen bromide produced as a by-product during the production of tetrabromobisphenol A (hereinafter referred to simply as TBA) which is widely used as a flame retardant for synthetic resins, in the form of hydrobromic acid. More particularly, the present invention relates to a method for efficiently recovering methanol and by-product hydrobromic acid from a filtrate obtained by brominating bisphenol A in methanol and filtering off the resulting brominated bisphenol A, so as to reduce the cost for the production of TBA.

For the production of TBA, it has been common to employ a method wherein bisphenol A is dissolved in methanol or in an aqueous methanol solution, and bromine is added and reacted thereto to obtain TBA. In such a case, hydrogen bromide formed as a by-product is likely to react methanol as a solvent to form methyl bromide. In a case where formation of methyl bromide is not desired, Japanese Examined Patent Publication No. 376/1966 discloses a conventional method in which the reaction is conducted with an addition of water in a sufficient amount to prevent the formation of methyl bromide and to precipitate TBA, and after filtration, the filtrate is neutralized with e.g. sodium hydroxide, followed by distillation to recover methanol. Such a conventional method has drawbacks that it requires a step for neutralization and bromine atoms are fixed as an alkali metal salt.

The present inventors have conducted extensive studies to solve such problems of the conventional method and as a result, have found a method in which a sufficient amount of water is added to the filtrate from which the reaction product has been removed by filtration, followed by direct distillation for purification to separate methanol and hydrobromic acid. The present invention has been accomplished on the basis of this discovery.

Thus, the present invention provides a method for recovering hydrobromic acid and methanol from a filtrate obtained by brominating bisphenol A in a methanol solvent and filtering off the resulting brominated bisphenol A, which comprises adding water to the filtrate, followed by distillation for purification.

Now, the present invention will be described in further detail with reference to the preferred embodiments. The filtrate to be used in the present invention is a filtrate obtained by first brominating bisphenol A in methanol or in an aqueous methanol solution under such reaction conditions as to prevent formation of methyl bromide, and then adding a sufficient amount of water to precipitate crystals, followed by filtration. Accordingly, the components in the filtrate are methanol, hydrobromic acid, trace amounts of brominated bisphenols and a trace amount of methyl bromide.

Water is added to this filtrate to obtain a feed solution for distillation. The amount of water added is preferably at a level sufficient to bring the concentration of hydrobromic acid to a level of not higher than about 10% by weight.

Further, it is preferred to preliminarily extracting and separating brominated bisphenols present in trace amounts in the feed solution for distillation, with an organic solvent such as chlorobenzene.

The feed solution for distillation treated as described above, is subjected to distillation for purification to recover methanol from the top of the distillation tower and hydrobromic acid from the bottom of the tower.

The distillation may be of a continuous system or of a semi-batch system. However, a continuous system is preferred.

The pressure for distillation may be atmospheric pressure. However, the distillation can be conducted either under a reduced pressure or a slightly elevated pressure. Recovered methanol may be reused by itself as a solvent for reaction.

Hydrobromic acid may be further concentrated by a separate distillation tower and may be used for other purposes as highly concentrated hydrobromic acid, or it may be subjected to oxidation treatment with e.g. chlorine to recover it in the form of bromine.

As described in the foregoing, according to the method of the present invention wherein methanol and hydrobromic acid are directly separated, by-product hydrobromic acid can be utilized effectively, and the production cost of TBA can be reduced.

Now, the present invention will be described in further detail with reference to Examples. However, it should be understood that the present invention is by no means restricted to such specific Examples.

EXAMPLE 1

Bisphenol A was dissolved in a methanol solvent, and bromine in an amount corresponding substantially to the theoretical amount at 20° C., was added thereto. The mixture was sufficiently aged. Then, water was added to precipitate crystals of TBA. Then, the crystals were separated by filtration under reduced pressure to obtain a filtrate. To this filtrate, water was further added. Then, brominated bisphenols were extracted with chlorobenzene to obtain a feed solution for distillation having the following composition.

Methanol: 28.00 wt %, water: 64.94 wt %, HBr: 7.02 wt %, methyl bromide: trace, chlorobenzene: 0.04 wt %, and brominated bisphenols: trace.

Then, 1,000 g of the above feed solution was distilled by a column of 30 mm in diameter $\times$ 1000 mm packed with Fenske's rings, whereby 274 g of methanol was obtained from the top and 713 g of 10% hydrobromic acid was obtained from the bottom. No formation of methyl bromide was observed, and the recovery of methanol was 98%, and the recovery of hydrobromic acid was 99%.

COMPARATIVE EXAMPLE 1

In the same manner as in Example 1, a filtrate having the following composition was obtained.

Methanol: 54.66 wt %, water: 28.64 wt %, HBr: 13.79 wt %, methyl bromide: trace, and brominated bisphenols: 3.00 wt %.

Then, 1,000 g of this filtrate was distilled in the same manner as in Example 1, whereby formation of 7 g of methyl bromide was observed.

What is claimed is:

1. A method for recovering hydrobromic acid and methanol from a filtrate obtained by brominating bisphenol A in a methanol solvent and filtering off the resulting brominated bisphenol A, which comprises adding water to the filtrate until the concentration of hydrobromic acid in the filtrate becomes not higher than about 10% by weight, followed by distillation for purification.

2. The method according to claim 1, wherein brominated bisphenols present in the filtrate are extracted by means of an organic solvent and separated prior to this distillation.

* * * * *